United States Patent
Pilat et al.

(10) Patent No.: US 9,264,085 B2
(45) Date of Patent: Feb. 16, 2016

(54) UNIVERSAL WIRELESS TRAINABLE TRANSCEIVER UNIT WITH INTEGRATED BIDIRECTIONAL WIRELESS INTERFACE FOR VEHICLES

(75) Inventors: Horia Eduard Pilat, Pulheim (DE); Chris H. Vuyst, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 13/530,478

(22) Filed: Jun. 22, 2012

(65) Prior Publication Data

US 2012/0274455 A1 Nov. 1, 2012

Related U.S. Application Data

(63) Continuation of application No. PCT/US2011/022002, filed on Jan. 21, 2011.

(51) Int. Cl.
*G08C 19/12* (2006.01)
*H04B 1/20* (2006.01)
*G08C 17/02* (2006.01)

(52) U.S. Cl.
CPC ............... *H04B 1/202* (2013.01); *G08C 17/02* (2013.01); *G08C 2201/20* (2013.01); *G08C 2201/92* (2013.01)

(58) Field of Classification Search
None
See application file for complete search history.

(56) References Cited

U.S. PATENT DOCUMENTS

| 5,614,891 A * | 3/1997 | Zeinstra et al. ............ 340/12.24 |
| 5,619,190 A | 4/1997 | Duckworth et al. |
| 5,661,804 A | 8/1997 | Dykema et al. |
| 5,850,188 A * | 12/1998 | Doyle et al. ............. 340/539.24 |
| 5,903,226 A | 5/1999 | Suman et al. |
| 6,225,898 B1 * | 5/2001 | Kamiya et al. ................ 340/505 |
| 6,292,230 B1 * | 9/2001 | Shui et al. ...................... 348/705 |
| 7,221,256 B2 | 5/2007 | Skekloff et al. |
| 7,346,374 B2 | 3/2008 | Witkowski et al. |
| 2004/0048622 A1 * | 3/2004 | Witkowski et al. ........ 455/456.6 |
| 2006/0089118 A1 * | 4/2006 | Whitehouse .................. 455/352 |

(Continued)

FOREIGN PATENT DOCUMENTS

| EP | 0 935 226 B1 | 8/1999 |
| JP | 09-233566 | 9/1997 |

(Continued)

OTHER PUBLICATIONS

Supplementary Search Report in Corresponding European application No. 11 73 7465.2 dated Feb. 16, 2015.

(Continued)

*Primary Examiner* — Brian Zimmerman
*Assistant Examiner* — Kevin Lau
(74) *Attorney, Agent, or Firm* — Foley & Lardner LLP; Scott P. Ryan

(57) ABSTRACT

The invention relates to a universal wireless trainable transceiver unit with integrated bidirectional wireless interface functionality, and a method for same. Using a scan, push button or untrained channel mode, a user may enter into a wireless bidirectional interface mode of a trainable transceiver. The interface mode allows a user to select a sub-set of modes that include diagnostics, flash and vehicle interface. Each mode provides the trainable transceiver to communicate wirelessly in a bidirectional manner with another remote device.

13 Claims, 10 Drawing Sheets

(56) References Cited

U.S. PATENT DOCUMENTS

2009/0059890 A1 3/2009 Cordeiro et al.
2010/0113011 A1* 5/2010 Gregg et al. .......... 455/425

FOREIGN PATENT DOCUMENTS

JP      2003-319470       11/2003
WO   WO-2008/027824 A2    3/2008

OTHER PUBLICATIONS

International Preliminary Report on Patentability and Written Opinion of the International Searching Authority dated Jul. 24, 2012, 5 pages.

International Search Report in PCT/US2011/022002 dated Mar. 22, 2011, 2 pages.

Office Action dated May 13, 2015 in corresponding Chinese Application No. 201180006670.9, 3 pages.

Office Action dated Nov. 11, 2014, in corresponding Japanese application No. 2012-550141, 4 pages.

Office Action dated Sep. 2, 2014, in corresponding Chinese application No. 201180006670.9 and English translation, 12 pages.

Office Action dated Oct. 30, 2015, received in related U.S. Appl. No. 14/511,631.

* cited by examiner

| RFCOMM_DataPacket.Command | RFCOMM_DataPacket.PayloadLength (bytes) |
|---|---|
| 0x10 – REFLASH_ENC_DATA | 62 |
| 0x11 – REFLASH_ACK | 3 |
| 0x12 – REFLASH_STATUS | 10 |
| | |
| | |
| 0x80 – DIAG_REQ (request) | 1 – 62 |
| 0x81 – DIAG_RSP (response) | 1 – 62 |
| | |
| | |

FIG. 5

UNIVERSAL WIRELESS TRAINABLE TRANSCEIVER UNIT WITH INTEGRATED BIDIRECTIONAL WIRELESS INTERFACE FOR VEHICLES

CROSS REFERENCE TO RELATED APPLICATIONS

The present application is a continuation of International Application No. PCT/US2011/022002 filed Jan. 21, 2011, which claims the benefit of and priority to German Application No. 102010005385.6, filed Jan. 22, 2010, the entire disclosures of which are hereby incorporated by reference in their entireties.

TECHNICAL FIELD

The invention relates to a universal wireless trainable transceiver unit with integrated bidirectional wireless interface functionality, and a method for same.

BACKGROUND

Conventional systems for controlling appliances and devices, such as garage door openers, security gates, home alarms, lighting, computers, etc., use individual remote controls to operate a respective appliance and/or device. With this conventional system, it is difficult to control multiple devices or appliances, much less consolidate operation of the appliances and devices into a single, controllable system. For example, garage door opener mechanisms open and close a garage door in response to a radio frequency control signal. The control signal is typically generated and transmitted from a remote control that is sold with the garage opener. The control signal has a preset carrier frequency and control code such that the garage door opener mechanism is responsive only to the remote control issuing the associated control signal. A problem associated with this type of system is that the door opener must receive a specific predetermined control signal in order to be operated. That is, each appliance and device must receive a specific predetermined control signal. Therefore, a user wishing to control multiple appliances and/or devices is required to have multiple remote controls.

With an ever evolving technological society, there is an increasing demand for a communication system that is capable of operating multiple appliances and devices in a consolidated manner. Communication systems currently exist which enable multiple appliances and devices to communicate with a central or single remote device. One such system is Homelink™, owned by Johnson Controls, Inc., in which a trainable transceiver is able to "learn" characteristics of received control signals such that the trainable transceiver may subsequently generate and transmit a signal having the learned characteristics to a remotely controlled device or appliance. FIG. 1 is an example of a wireless control system 12 having a transceiver circuit 14 and a remote electronic system 16 (remote device) which also has a transceiver circuit 18. One such system is disclosed in U.S. Pat. No. 5,903,226, hereby incorporated by reference. Another such system is disclosed in EP Pat. No. 0 935 226 B1, also hereby incorporated by reference.

In order for the trainable transceivers to operate, each signal is typically associated with a user-actuated switch 20 or a user selects one of the learned signals on the trainable transceiver by selecting an associated switch 20 (e.g. by pressing a button on the trainable transceiver associated with the device to be operated). For example, a user may select one or multiple of buttons B1, B2, B3 illustrated in FIG. 2. For the trainable transceiver to learn the signal characteristics of various signals of different length and duration, the amount of memory 22 provided and allocated within the trainable transceiver for each transmission channel must be sufficient to store the characteristics of the largest signal to be learned.

Additionally, in order for the trainable transceiver to work properly in the communication system, it must be compatible to the appliance or device, and in particular, with potentially numerous appliances and devices that the trainable transceiver is likely to communicate with over the course of time. Naturally, it is difficult to predict which appliances and/or devices a user may wish to control such that the trainable transceiver may be programmed for compatibility. Moreover, as new appliances and devices are developed, after the trainable transceiver has been initially programmed, there is no current process to update the trainable transceiver such that the new appliances and devices are compatible for use in the communication system.

SUMMARY OF THE INVENTION

The invention relates to a universal wireless trainable transceiver unit with integrated bidirectional wireless interface functionality, and a method for same.

In one embodiment of the invention, there is a method of wirelessly interfacing with a trainable transceiver located in a vehicle, including entering into one of a plurality of modes; and interfacing with a remote device using one of the plurality of modes in a bidirectional communication.

In one aspect of the invention, the method further includes selecting one of a plurality of inputs on the trainable transceiver; transmitting packets from the trainable transceiver to the remote device; receiving packets from the remote device, the packet including a request command; and transmitting a response command to the remote device based on the requested command.

In another aspect of the invention, the method further includes determining whether the packet received by the trainable transceiver is valid; when the received packet is invalid, and a predetermined period of time has elapsed, entering into train mode; and when the received packet is valid, determining whether the request from the remote device is valid: if the request is invalid, entering into train mode, and if the request is valid, entering into the train mode when the request is for normal operation, and entering into a wireless diagnostic mode when the request is for diagnostic mode.

In still another aspect of the invention, the method further includes selecting a sequence of one of a plurality of inputs on the trainable transceiver; determining whether the sequence is valid; if the sequence is invalid, entering into a normal operation mode; and if the sequence is valid, receiving a request command from the remote device at the trainable transceiver, and transmitting a response command to the remote device from the trainable transceiver based on the request command.

In yet another aspect of the invention, the method further includes determining whether the packet has been received; if the packet has been received and is valid, determining which one of the plurality of modes has been requested by the request command; if the request command is for diagnostics, sending a response command to the remote device to set a flag to enter into wireless diagnostic mode, and entering into the wireless diagnostic mode; and if the request command is for flash, sending a response command to the remote device and entering into a wireless flash mode.

In another aspect of the invention, the method further includes if the packet has not been received, and a predetermined amount of time has elapsed, entering into normal operation mode; if the packet has been received, determining whether the received packet is valid; and if the received packet is invalid, entering into normal operation mode.

In yet another aspect of the invention, the plurality of modes includes one of a wireless diagnostic mode, a wireless flash mode and a wireless vehicle interface mode.

In still another aspect of the invention, each of the plurality of modes is an executable program product stored in memory of the trainable transceiver and executable by a microcontroller.

BRIEF DESCRIPTION OF THE DRAWINGS

FIG. 5 is an exemplary table including packet commands for transmission and receipt in accordance with the invention.

DESCRIPTION OF THE INVENTION

The invention relates to a universal wireless trainable transceiver unit with integrated bidirectional wireless interface functionality, and a method for same. Using a scan, push button or untrained channel mode, a user may enter into a wireless bidirectional interface mode of a trainable transceiver. The interface mode allows a user to select a sub-set of modes that include, but are not limited to, diagnostics, flash (e.g. programming and reprogramming) and vehicle interface. Each mode provides the trainable transceiver to communicate wirelessly in a bidirectional manner with another remote device.

The system provides two types of functionality. The first type of functionality is a trainable transceiver that replaces one or more remote controls with a single built-in component through the learning and reproduction of radio frequency codes of remote controls used, for example, to activate garage doors, property gates, security and lighting systems.

Figure 3:
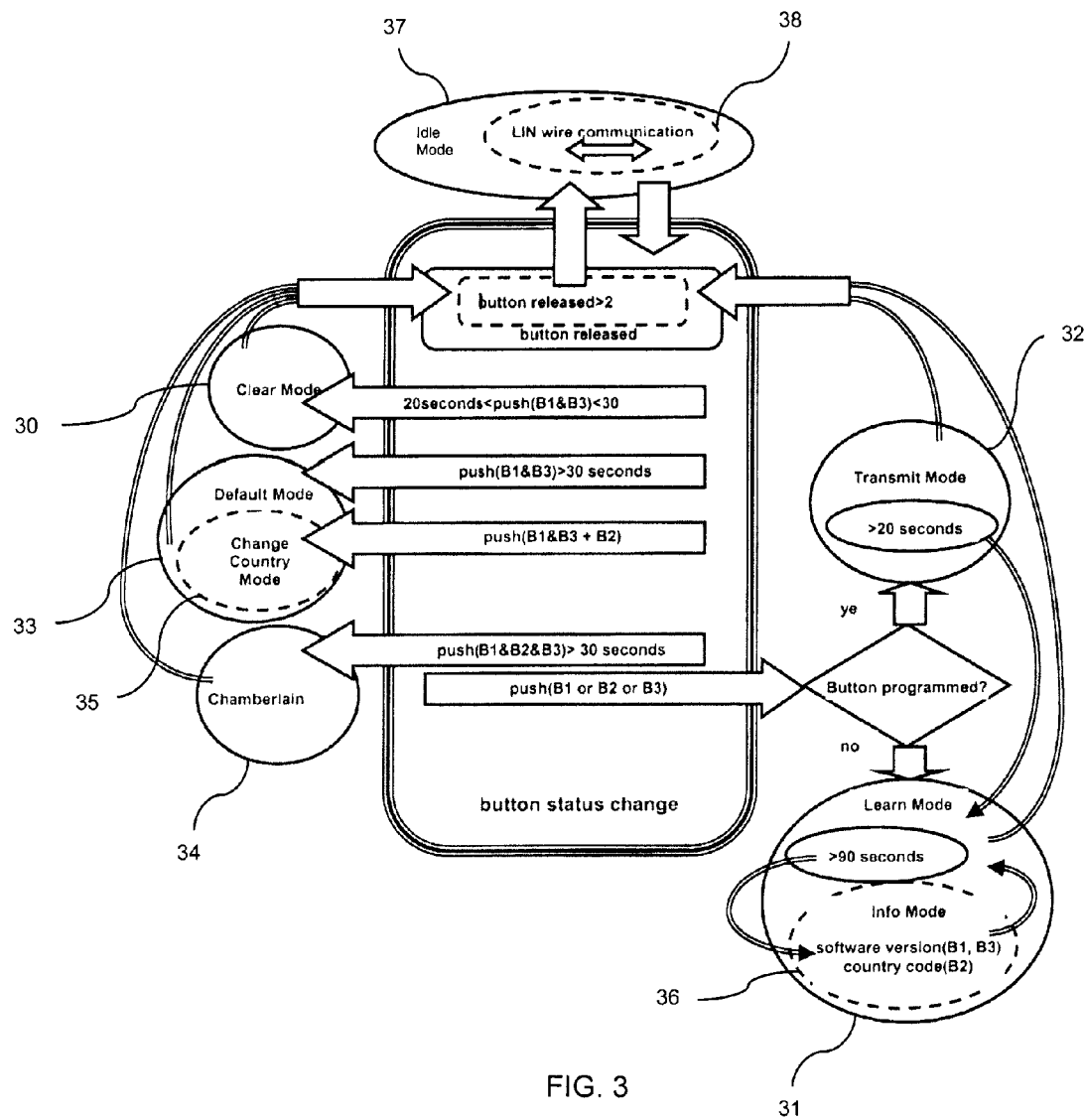
FIG. 3 is an exemplary diagram of a trainable transceiver in accordance with one embodiment in accordance with the invention.

Versions of the trainable transceiver of this type base functionality on a button status change and use wired communication, as depicted in FIG. 3. That is, in order to change modes on the trainable transceiver, a button or combination of buttons or button sequence must be initiated. Once initiated, the status mode changes to one of the following: an Idle Mode 37 (without an active LIN communication 38), Clear Mode 30, Learn Mode 31, Transmit Mode 32, Default Mode 33, Chamberlain Mode 34, Change Country Code Mode 35 and Info Mode 36. Specifically, in Idle Mode 37, the trainable transceiver must wait for an active LIN wire communication 38 from the vehicle in order to accomplish diagnostics, re-flash of memory, etc.

The second type of functionality is a trainable transceiver having bidirectional communication (transmit-receive) with a remote device, as described in more detail below. The trainable transceiver of the invention enhances functionality by providing a wireless bidirectional interface mode 40. The wireless bidirectional interface mode 40 provides new modes of operation, namely wireless diagnostic mode 41, wireless flash mode 42, and wireless vehicle interface mode 43. These three modes are in addition to the Clear Mode 30, Learn Mode 31, Transmit Mode 32, Default Mode 33, Chamberlain Mode 34, Change Country Code Mode 35 and Info Mode 36 used in the prior versions of the trainable transceiver.

The trainable transceiver of the instant invention replaces the idle mode 37 with a wireless bidirectional interface mode 40 (transmit-receive mode). The wireless bidirectional interface mode 40 enables the trainable transceiver to communicate wirelessly with a remote device in one of the three modes: 1) automatic scan mode; 2) push button mode; and 3) untrained channel mode.

In one embodiment, the trainable transceiver continuously or automatically scans for devices using a receiver 24 of the built-in wireless transceiver 14. Each device has a frequency and an ID data code associated therewith. When one of the frequencies is received, the microcontroller 26 in the trainable transceiver checks to determine whether a corresponding ID code exists in memory 22, and if so, begins a communication with the remote device. The mode of communication (e.g. wireless diagnostic mode 41, wireless flash mode 42, wireless vehicle interface mode 43) depends on the remote device detected. For example, if the remote device is a diagnostic tool, the trainable transceiver will enter into the wireless diagnostic mode 41. Additionally, the data received from the remote device could be transferred to other electronic devices in the car through an internal network.

Figure 1:
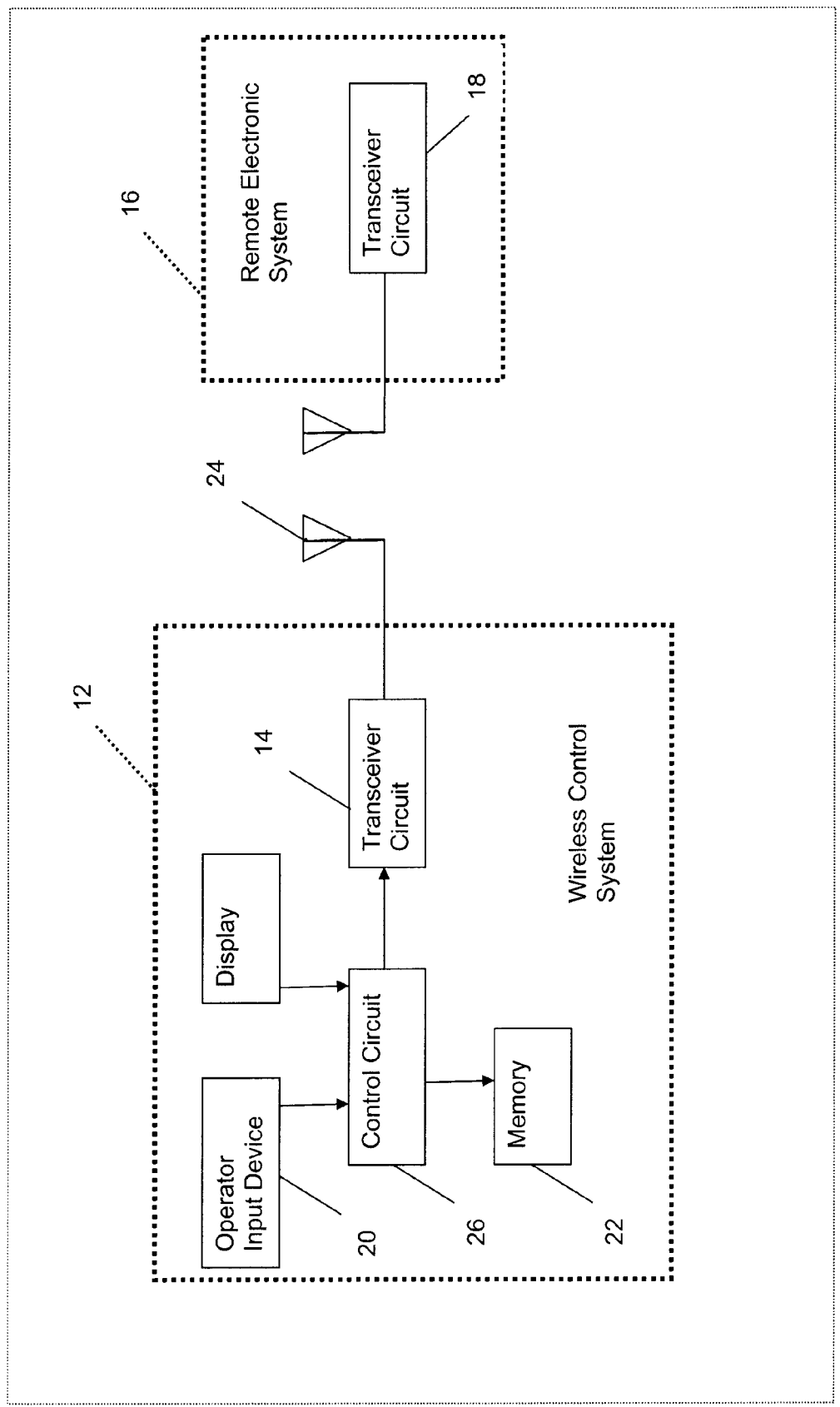
FIG. 1 is an exemplary schematic diagram of a trainable receiver in accordance with the prior art.
Figure 2:
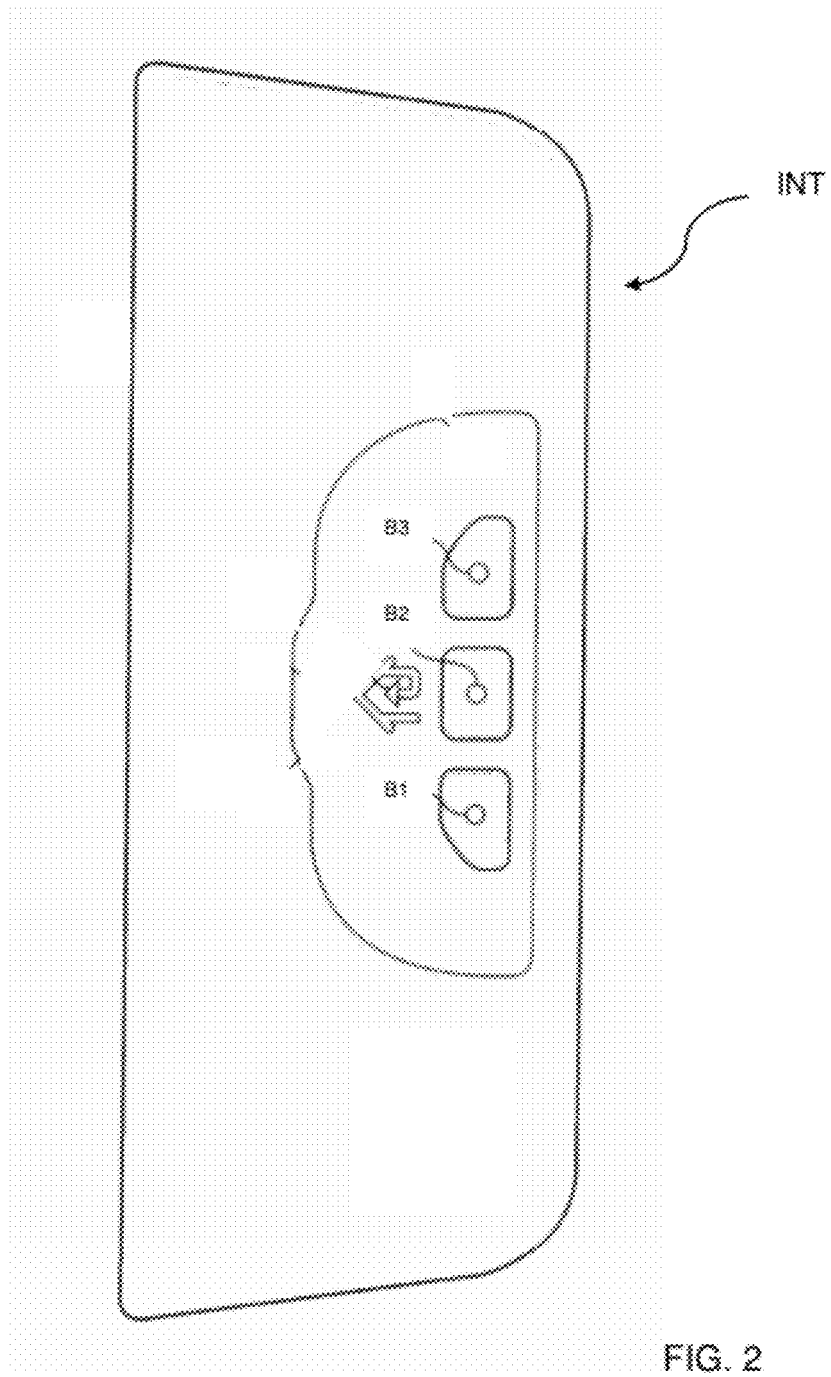
FIG. 2 is an exemplary interface for a trainable transceiver in accordance with FIG. 1.

The wireless bidirectional interface mode may also be set using a push button mode (button status change). As illustrated, for example, in FIG. 4, a user may select or push buttons B1, B2 and B3 on the interface INT (FIG. 2) to enter into a specified mode. For example, pressing buttons B1 and B2 (concurrently or in sequence) on interface INT results in entering the wireless diagnostic mode 41, whereas pressing buttons B2 and B3 (concurrently or in sequence) on interface INT results in entering the wireless flash mode 42. In another exemplary, if the Boot Loader Code BLC (FIG. 10) detects a power up initiated by the following exemplary sequence: 1) all three buttons B1, B2, B3 pressed, 2) all three buttons B1, B2 and B3 are released, 3) the outer buttons B1 and B3 are pressed within a predetermined amount of time, then released, and 4) the middle button B2 is pressed within a predetermined amount of time, the Boot Loader Code BLC will go into a packet receive mode, and wait for a predetermined amount of time for a command from the remote device indicating what mode to enter (wireless diagnostic mode 41, wireless flash mode 42 or wireless vehicle interface mode 43). If a valid command is not received within the predetermined amount of time, the trainable transceiver will remove the power hold and power down. Pressing a button during this time, as well as any time while in one of the modes will also remove the power hold and allow the trainable transceiver to power down. It is appreciated that the number of buttons, sequences and/or time frame is not limited to the illustrated embodiment. Any variation or number of buttons and time frames may be used to enter into a specified mode.

Figure 6:
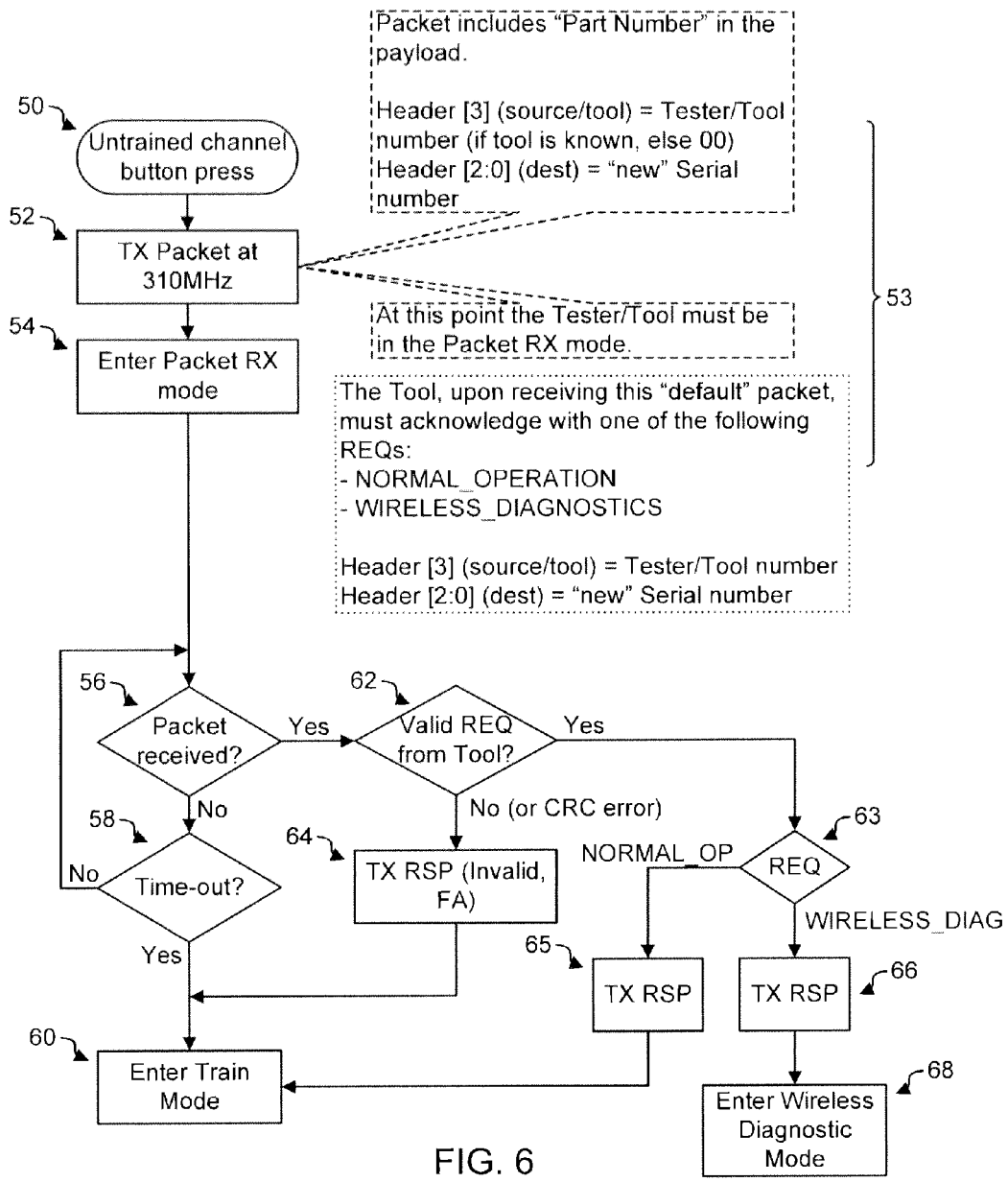
FIG. 6 is an exemplary flow diagram of entry into various modes in accordance with the invention.

Another method to enter into the wireless bidirectional interface mode 40 is to use the untrained channel default transmission method as best shown in FIG. 6. When an untrained channel button is pressed at step 50 (e.g. selection of a no-trained button), the trainable transceiver transmits a packet at step 52 for a predetermined period of time. In response to the transmission, the trainable transceiver will enter a packet receive RX mode at step 54 to wait for a request from a remote device to enter a specified mode (e.g. wireless diagnostic mode), as described in more detail below.

Setting or activating the wireless bidirectional interface mode 40 enables a user to select any one of three sub-modes, including 1) a wireless diagnostic mode 41; 2) a wireless flash mode 42; and 3) a wireless vehicle interface mode 43. These three modes 41, 42, 43 may be entered by scan, push button or untrained channel selection as described above or as described in the detailed, exemplary embodiments that follow.

Wireless Diagnostic Mode

Wireless diagnostics provides a wireless interface (i.e. there is no need to disassemble the trainable transceiver to connect cables for diagnostics) for performing specific diagnostic functions internal to the trainable transceiver diagnostics found in vehicles. Wireless diagnostic mode 41 is typically for near field communications, such as using the diagnostic tool to diagnose the trainable transceiver. Diagnostic commands support manufacturing and bench testing and information gathering, as shown for example in the table of FIG. 5. The diagnostic packet commands include, for example, DIAG_REQ (request) and DIAG_RSP (response). It is understood that these commands are exemplary in nature and are not limited to those described in the table of FIG. 5.

Figure 7:
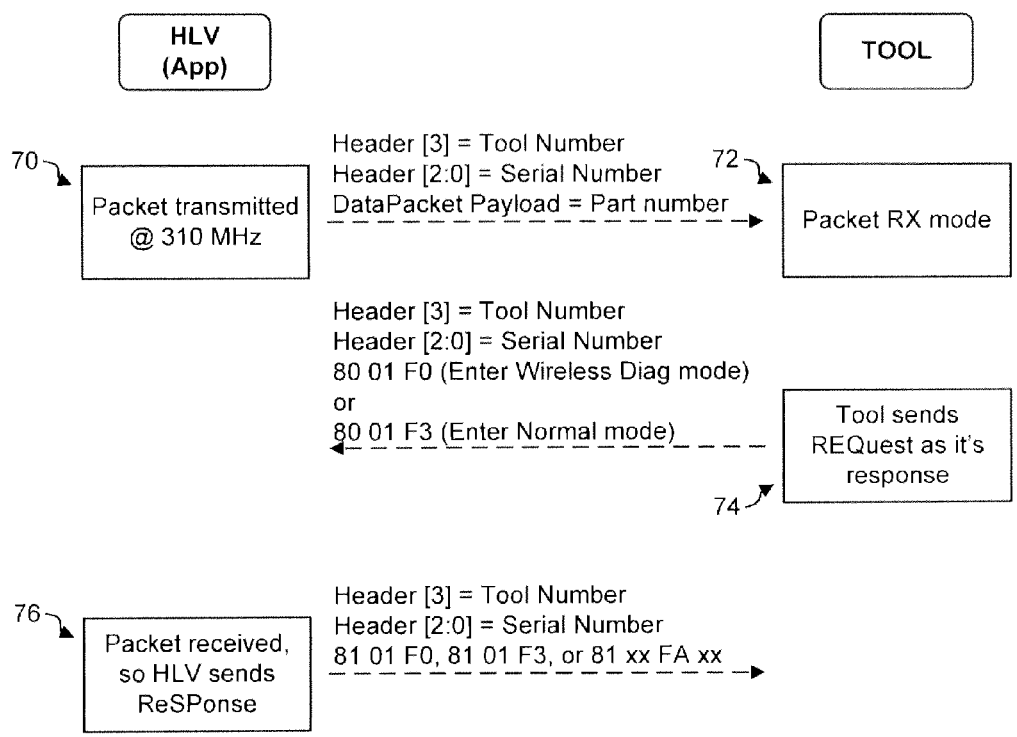
FIG. 7 is an exemplary diagram of communication between a trainable transceiver and a testing apparatus in accordance with the invention.

FIG. 6 discloses an exemplary sequence for entering the wireless diagnostic mode 41. Here, once an untrained channel button (mode) press has been performed at step 50 as described above, the trainable transceiver may enter into either a wireless diagnostic mode 41, or a train/learn mode. Specifically, once an untrained channel button press has been accomplished at step 50, a packet is transmitted (TX) for a predetermined amount of time at step 52. The packet can include, for example, a default code, a part number, etc. in the payload. Additionally, in order for the remote device (for example, Tool) to receive the packet, it must be in packet receipt mode. Upon transmitting packets in step 52, the trainable transceiver and tool enter into a communication state as depicted in FIG. 7 (described below). Upon receipt of the initial packet from the trainable transceiver at the Tool, the Tool acknowledges receipt of the packet and sends a command back (e.g. a Request REQ) to the trainable receiver at step 53, and the packet receive mode begins at step 54.

The communication state is illustrated, for example, in FIG. 7. Here, a packet is transmitted by the trainable transceiver (represented by HLV (App), which refers to the application code AC of the trainable transceiver memory) at step 70. Upon receipt by the tool during packet receive mode 72, a request (REQ) is sent from the Tool in step 74 until a predetermined amount of requests are sent or a response (RSP) is received back from the trainable transceiver at 76.

As packets are transmitted between the trainable transceiver and the Tool, the following is carried out. With reference to FIG. 6, at step 56 it is determined whether a packet has been received. If no packet has been received, then at step 58 it is determined whether a time out has occurred. If a time out has occurred, then the trainable transceiver enters into the Train/Learn Mode at step 60. Otherwise, the procedure loops back to step 56 to monitor whether a packet has been received until such time out occurs. If, on the other hand, a packet has been received from the Tool, the procedure determines whether the received packet is a valid REQ from the Tool at step 62. If the packet is determined to be invalid, then an invalid RSP is transmitted as determined at step 64 and Train/Learn Mode is entered at step 60. Alternatively, an error may be present in the REQ sent from the Tool, in which case an invalid transmission response (TX RSP) is also determined at step 64. If the packet received is determined to be valid REQ from the Tool in step 62, then it is determined at step 63 whether the REQ is a "NORMAL_OP" (normal operation) or a "WIRELESS_DIAG" (wireless diagnostic) REQ. If it is determined in step 63 that the REQ is a wireless diagnostic request, then a response RSP for entering diagnostic mode is transmitted at step 66, and the wireless diagnostic mode 41 is entered at 68. If, on the other hand, the REQ is a normal operation request, then a RSP for entering Train/Learn Mode is transmitted at step 65, and the Train/Learn Mode is entered at 60. It is appreciated that the wireless diagnostic mode 41 may also be entered via scan mode or button sequence detection (push button mode), as described below with respect to the wireless flash mode 42. It is also understood that the REQ is not limited to the described embodiments, and that any command or text may be used as the REQ.

Wireless Flash Mode

Figure 4:
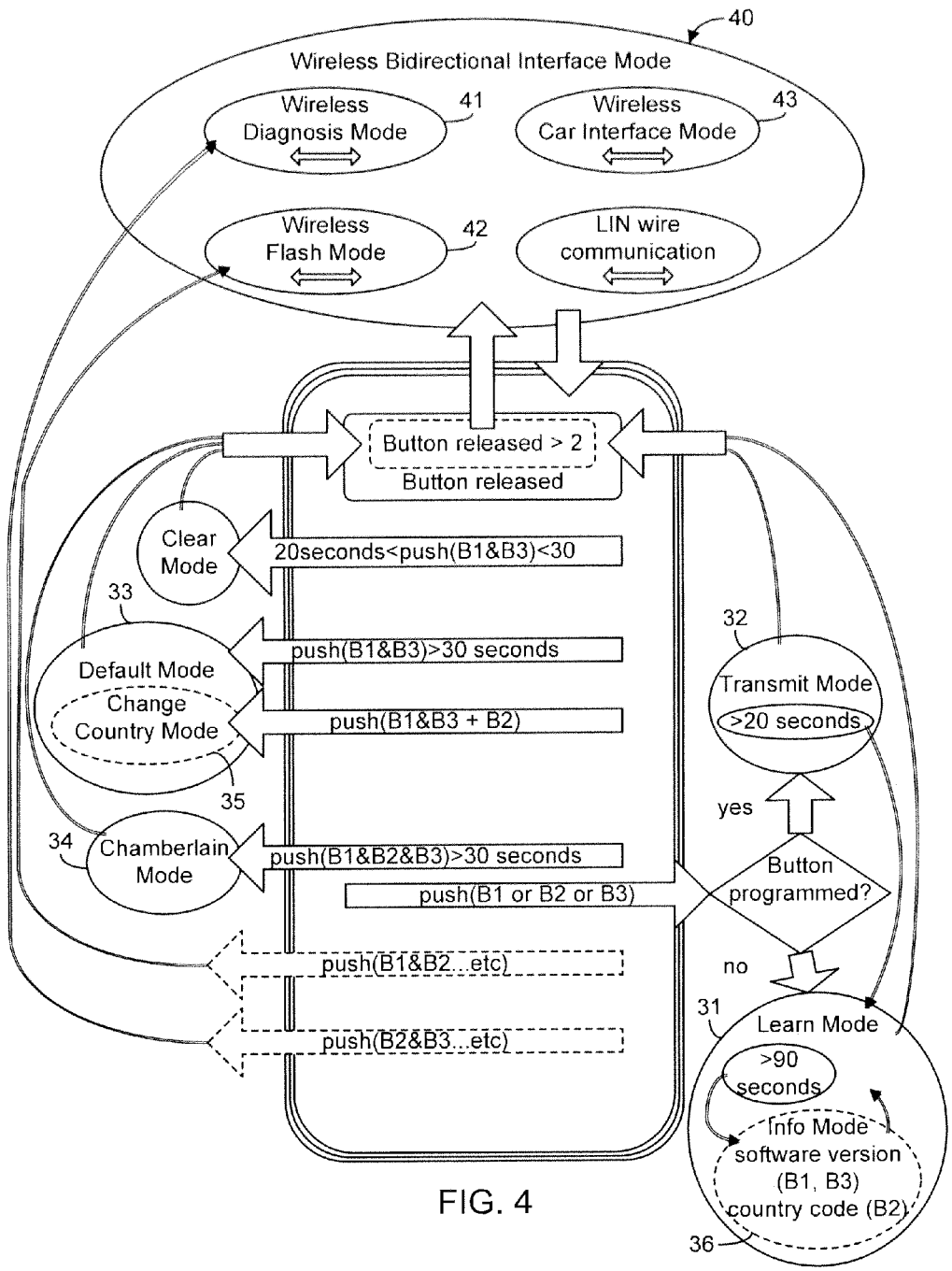
FIG. 4 is an exemplary diagram of a trainable transceiver in accordance with another embodiment in accordance with the invention.
Figure 8:
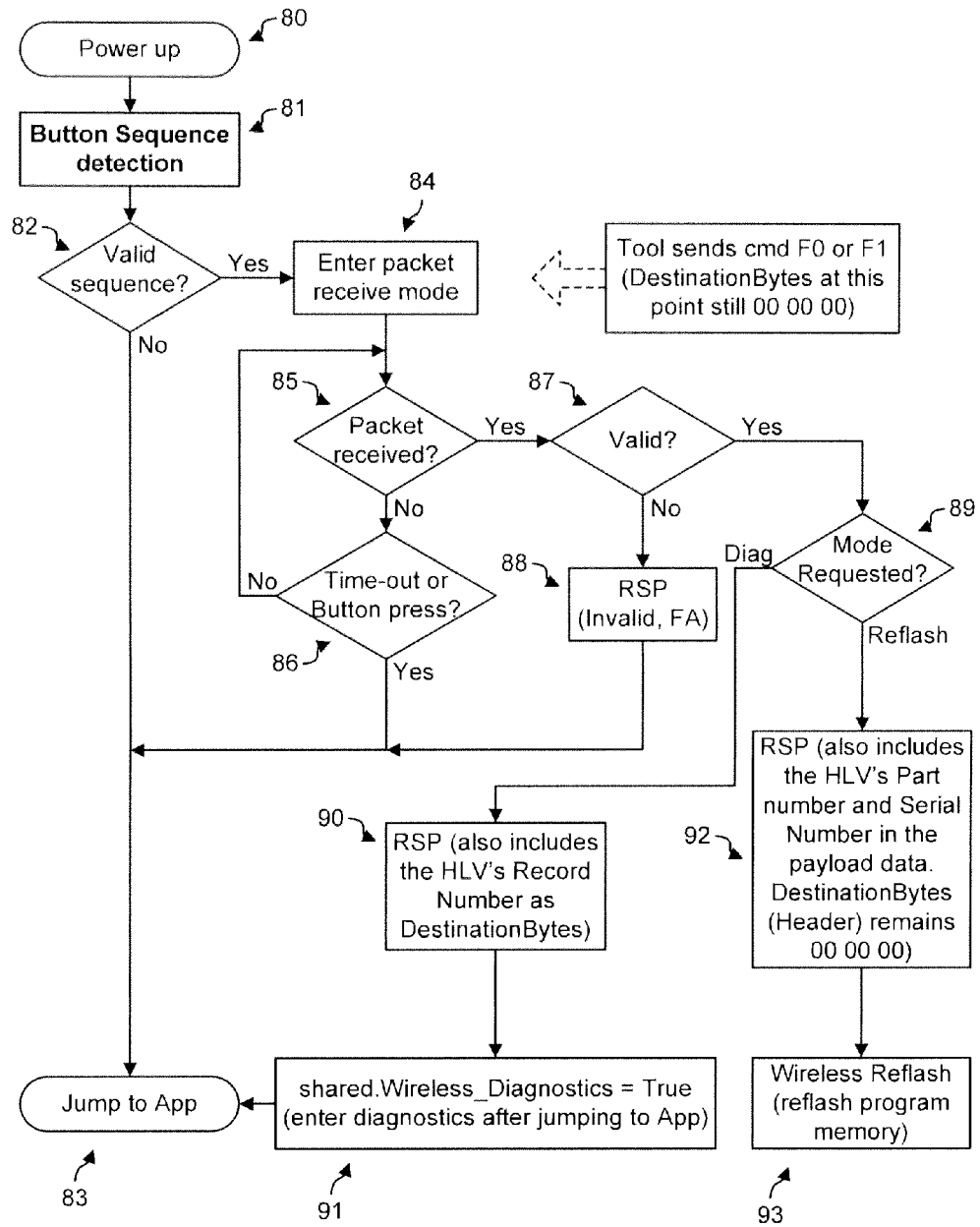
FIG. 8 is an exemplary flow diagram of entry into various modes of the invention.

The wireless flash mode 42 enables a user to program (flash) or reprogram (reflash) the trainable transceiver. The details of programming/reprogramming the trainable transceiver are not discussed in this application. Rather, the ability to enter into wireless flash mode 42 using the trainable transceiver is addressed as follows and with reference to FIG. 8. FIG. 8 is an exemplary flow diagram of entry into various modes of the invention. Specifically, the flow diagram illustrates a user entering into the wireless diagnostic mode 41 or the wireless flash mode 42 using a predefined button sequence. It is appreciated that other modes may also be entered into using the button sequence mode, including the wireless vehicle interface mode 43 and wireless diagnostic mode 41. Upon powering up the trainable transceiver (for example, pressing a button B1, B2, B3) at step 80, a user enters a sequence of buttons which are detected by the trainable transceiver at step 81. For example, as depicted in FIG. 4, the user may push buttons B2 and B3 on the interface INT to initiate the button sequence detection in step 81. If a valid button sequence is not detected at step 82, then the procedure continues to step 83 ("Jump to App," which refers to the normal operation Application code of the trainable transceiver depicted in FIG. 10). If, on the other hand, a valid button sequence is detected at step 82, then the procedure continues to the enter packet receive mode in step 84. In this mode, the trainable transceiver and Tool begin communicating as explained below with reference to FIG. 9.

It is determined in step 85 whether a packet has been received from Tool. If no, then it is determined at step 86 whether a time out (e.g. predetermined time limit has expired) or button selection has occurred. If no time out of button selection has occurred as determined at step 86, the procedure loops back to step 85 to determine whether a packet has been received. If a time out or button selection has occurred, then the procedure continues to step 83 and returns to the "Jump to App" sequence (e.g. the normal operation application code sequence stored in memory of the trainable transceiver).

Figure 10:
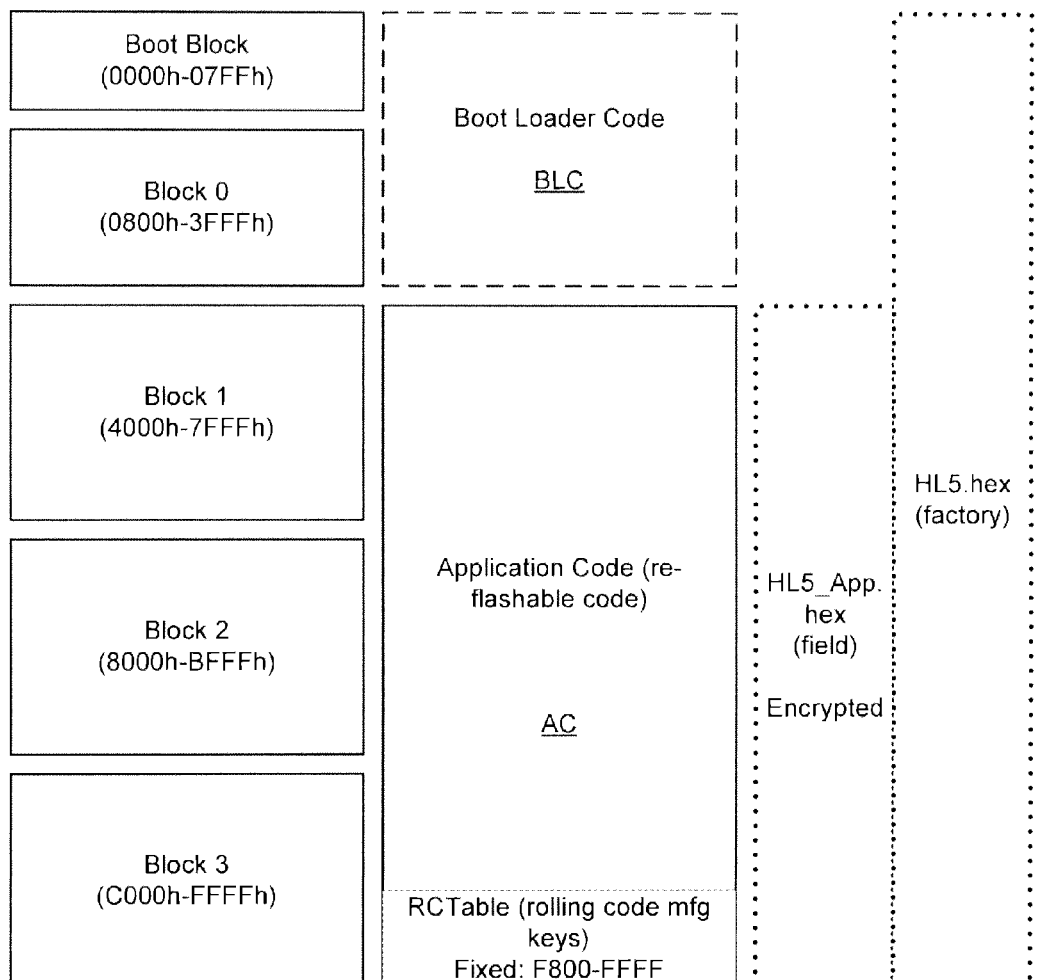
FIG. 10 is an exemplary boot loader code BLC and application code AC memory in the trainable transceiver in accordance with the invention.

As packets are transmitted between the trainable transceiver and the Tool, the following is carried out. If it is determined at step 85 that a packet has been received, then the trainable transceiver determines whether the packet is valid at step 87. If the packet is determined to be invalid, then at step 88 a RSP is sent to the Tool indicating that the packet is invalid and the procedure continues to step 83 where the trainable transceiver enters into normal operation mode by jumping to the appropriate application residing in the application code AC section of the trainable transceiver memory 100 as best shown in FIG. 10. If, on the other hand, it is determined that the packet is valid, then at step 89 the trainable transceiver determines which mode has been requested by the Tool in step 76 as shown in FIG. 7. If the wireless diagnostic mode 41 has been requested, then a flag is sent at step 90 indicating that the wireless diagnostic mode should be entered at step 91. The wireless diagnostic mode 41 is entered at step 83 by jumping to the application code AC residing in the trainable transceiver memory 100 depicted in FIG. 10. If the request at step 89 is to enter the wireless flash mode 42, then the trainable transceiver transmits a RSP at step 92 to enter into the wireless flash mode at step 93.

Wireless Vehicle Interface Mode

The wireless vehicle interface mode 43 provides the ability to link the trainable transceiver with various equipment located in or external to the vehicle (near field or far field), such as remote keyless systems, tire pressure gauges, mobile devices, other vehicles, garage doors, etc. Traditionally, for each of the aforementioned equipment, the vehicle includes a module that enables communication between the vehicle and the equipment. These modules can be replaced with the trainable transceiver such that the trainable transceiver becomes the communication interface between the vehicle and the equipments (the trainable transceiver replaces the modules). The trainable transceiver can be programmed to enable interfacing with countless devices and applications.

Figure 9:
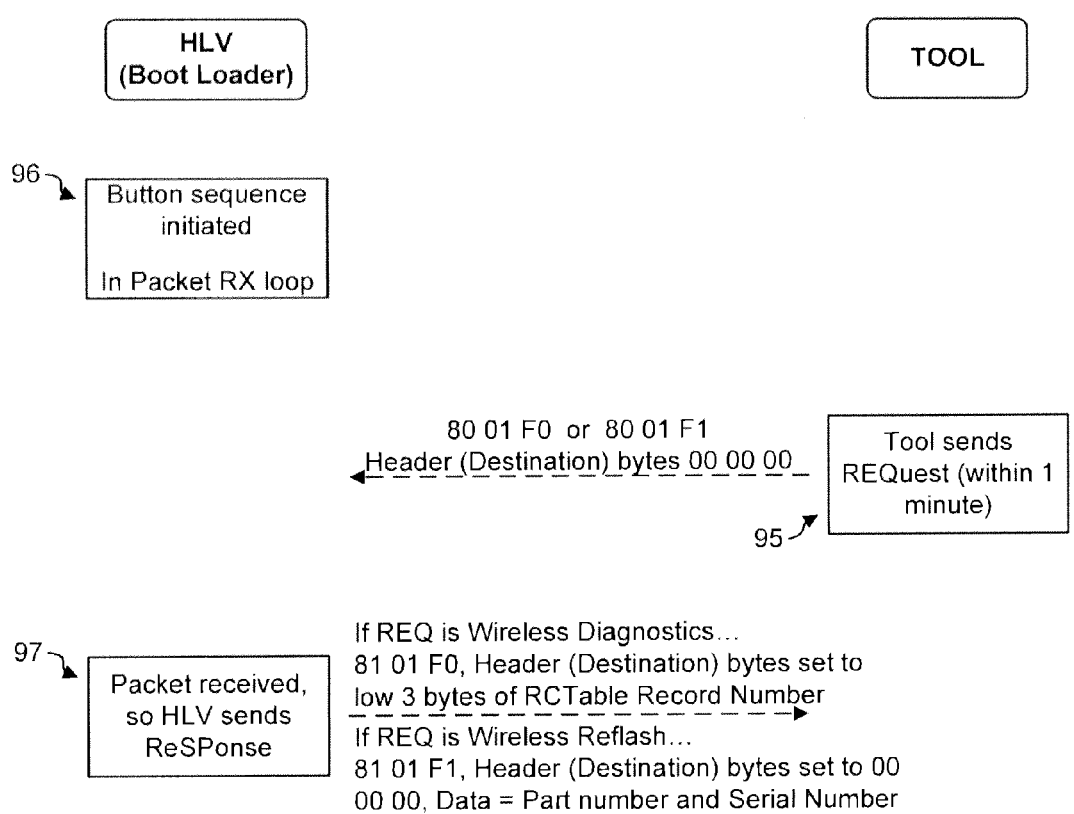
FIG. 9 is an exemplary diagram of communication between a trainable transceiver and a testing apparatus in accordance with the invention.

FIG. 9 illustrates an exemplary boot loader code BLC and application code AC memory of the trainable transceiver. At step 95, the Tool beings sending requests REQ (e.g. request for diagnostic or flash mode) back to the trainable transceiver. Once a button sequence has been initiated, the trainable transceiver begins to receive packets from the Tool at step 96. In response to the transmitted packets from the Tool, the trainable transceiver sends a response RSP back to the Tool including information relevant to the REQ at step 97.

Those skilled in the art can now appreciate from the foregoing description that the broad teachings herein can be implemented in a variety of forms. Therefore, while the described features have been described in connection with particular examples thereof, the true scope of the features should not be so limited since other modifications will become apparent to the skilled practitioner upon a study of the drawings and the present specification.

The invention claimed is:

1. A method of wirelessly interfacing with a trainable transceiver located in a vehicle, comprising:
   entering into one of a plurality of modes;
   interfacing with a remote device in a bidirectional communication using one of the plurality of modes;
   transmitting packets from the trainable transceiver to the remote device;
   transmitting packets including a request command from the remote device to the trainable transceiver;
   determining whether the packet received by the trainable transceiver from the remote device is valid;
   upon determining the packet received by the trainable transceiver is invalid, and a predetermined period of time has elapsed, entering into train mode;
   upon determining the packet received by the trainable transceiver is valid, determining whether the request command from the remote device is valid and:
   upon determining that the request command is invalid, entering into train mode,
   upon determining that the request command is valid, entering into the train mode when the request command is for normal operation, and entering into a wireless diagnostic mode when the request command is for diagnostic mode;
   transmitting a response command from the trainable transceiver to the remote device based on the requested command; and
   receiving one of a plurality of inputs on the trainable transceiver to enter into one of the plurality of modes.

2. The method of claim 1, further comprising:
   receiving a sequence of a plurality of inputs on the trainable transceiver; determining whether the sequence is valid;
   if the sequence is invalid, entering into a normal operation mode: and if the sequence is valid;
   receiving a request command from the remote device at the trainable transceiver, and
   transmitting a response command to the remote device from the trainable transceiver based on the request command.

3. The method of claim 2, further comprising: determining whether the packet received by the trainable transceiver from the remote device has been received;
   if the packet received by the trainable transceiver from the remote device has been received and is valid, determining which one of the plurality of modes has been requested by the request command;
   if the request command is for diagnostics, sending a response command to the remote device to set a flag to enter into wireless diagnostic mode, and entering into the wireless diagnostic mode; and
   if the request command is for flash, sending a response command to the remote device and entering into a wireless flash mode.

4. The method of claim 3, further comprising:
   if the packet transmitted from the remote device to the trainable transceiver has not been received by the trainable transceiver, and a predetermined amount of time has elapsed, entering into normal operation mode;
   if the packet transmitted from the remote device to the trainable transceiver has been received by the trainable transceiver, determining whether the received packet transmitted from the remote device to the trainable transceiver is valid; and if the received packet transmitted from the remote device to the trainable transceiver is invalid, entering into normal operation mode.

5. The method of claim 1, wherein the plurality of modes includes one of a wireless diagnostic mode, a wireless flash mode and a wireless vehicle interface mode.

6. The method of claim 5, wherein each of the plurality of modes is an executable program product stored in memory of the trainable transceiver and executable by a microcontroller.

7. A trainable transceiver unit for a vehicle comprising:
   a microcontroller;
   a memory in communication with said microcontroller; and
   a wireless bidirectional interface mode stored in said memory and having executable instructions configured to establish wireless bi-directional communication between said transceiver unit and at least one remote device, wherein wireless bi-directional communication between said transceiver and at least one remote device includes transmitting a packet from the trainable transceiver to the at least one remote device, wherein wireless bi-directional communication between said transceiver and at least one remote device further includes transmitting a packet, including a request command, from the at least one remote device to the trainable transceiver, wherein the trainable transceiver enters one of a plurality of modes in response to the request command, and wherein the trainable transceiver is further configured to:

determine whether the packet received by the trainable transceiver from the remote device is valid;

enter into train mode in response to determining the packet received by the trainable transceiver is invalid, and after a predetermined period of time has elapsed;

in response to determining the packet received by the trainable transceiver is valid, determine whether the request command from the remote device is valid and:

enter into train mode in response to determining that the request command is invalid; and in response to determining that the request command is valid, enter into the train mode when the request command is for normal operation, and enter into a wireless diagnostic mode when the request command is for diagnostic mode; and wherein the trainable transceiver is further configured to enter into one of the plurality of modes in response to receiving one of a plurality of inputs at the trainable transceiver.

8. A trainable transceiver unit as set forth in claim 7 further comprising: a wireless transceiver; and said wireless bidirectional interface mode including an automatic scan mode having executable instructions configured to initiate a continuous scan for the at least one remote device using the wireless transceiver.

9. A trainable transceiver unit as set forth in claim 7 further comprising:
a plurality of user inputs in communication With said microcontroller selectable by a user to initiate said wireless bi-directional interface mode of said transceiver unit.

10. A trainable transceiver unit as set forth in claim 9 further comprising:
said wireless hi-directional mode including a wireless diagnostic mode having executable instructions configured to provide a wireless interface for diagnosing the trainable transceiver;
a predefined wireless diagnostic mode selection sequence stored in said memory; and
said microcontroller configured to detect a selection sequence of the user inputs and execute said executable instructions of said wireless diagnosis mode in response to the selection sequence correlating with said predetermined wireless diagnostic mode selection sequence.

11. A trainable transceiver unit as set forth in claim 9 further comprising:
said wireless bi-directional mode including a wireless flash mode having executable instructions configured to enable a user to program and reprogram said trainable transceiver;
a predefined wireless flash mode selection sequence stored in said memory; and said microcontroller configured to detect a selection sequence of the user inputs
and execute said executable instructions of said wireless flash mode in response to the selection sequence correlating with said predetermined flash mode selection sequence.

12. A trainable transceiver unit as set forth in claim 9 further comprising:
said wireless bi-directional mode including a wireless vehicle interface mode having executable instructions configured to link said trainable transceiver unit with the at least one remote device;
a predetermined wireless vehicle interface mode selection sequence stored in said memory; and
said microcontroller configured to detect a selection sequence of the user inputs and execute said executable instructions of said wireless flash mode in response to the selection sequence correlating with said wireless vehicle interface mode selection.

13. The method of claim 1, wherein the plurality of operating modes at least one of a wireless flash mode, a wireless vehicle interface mode, or a wireless diagnostic mode.

* * * * *